(12) United States Patent
Bressan et al.

(10) Patent No.: US 7,929,165 B2
(45) Date of Patent: Apr. 19, 2011

(54) METHOD AND SYSTEM FOR CONTROLLING PRINTER UTILIZATION IN A NETWORKED ENVIRONMENT

(75) Inventors: Marco Bressan, La Tronche (FR); Guillaume Bouchard, Bernin (FR)

(73) Assignee: Xerox Corporation, Norwalk, CT (US)

( * ) Notice: Subject to any disclaimer, the term of this patent is extended or adjusted under 35 U.S.C. 154(b) by 1317 days.

(21) Appl. No.: 11/431,288

(22) Filed: May 10, 2006

(65) Prior Publication Data

US 2007/0263246 A1 Nov. 15, 2007

(51) Int. Cl.
*G06F 3/12* (2006.01)
*G06K 15/00* (2006.01)

(52) U.S. Cl. .................... 358/1.15; 358/1.13; 358/1.18

(58) Field of Classification Search .................. 358/1.15, 358/1.16, 1.17, 1.18, 1.14, 1.13, 1.1, 407, 358/400, 401, 402, 403, 404, 444, 468, 437; 715/200, 273, 274; 707/600, 608, 609, 705, 707/708; 347/2, 3, 5, 14, 23; 399/1, 8, 9
See application file for complete search history.

(56) References Cited

U.S. PATENT DOCUMENTS

| | | | |
|---|---|---|---|
| 2004/0061909 A1 | 4/2004 | Ferlitsch et al. | |
| 2004/0078425 A1 | 4/2004 | Sandfort et al. | |
| 2004/0267868 A1 | 12/2004 | Wilk | |
| 2005/0078332 A1 | 4/2005 | Brown | |
| 2005/0138079 A1* | 6/2005 | Liu et al. | 707/104.1 |
| 2005/0231758 A1* | 10/2005 | Reynolds | 358/1.15 |

FOREIGN PATENT DOCUMENTS

| | | |
|---|---|---|
| WO | WO 97/35278 | 9/1997 |
| WO | WO 2005/077023 A2 | 8/2005 |

OTHER PUBLICATIONS

Antonietta Grasso and Jean-Luc Meunier, "Who Can Claim Complete Abstinence from Peeking at Print Jobs?", CSCW'02, Nov. 16-20, 2002, p. 1-10, New Orleans, Louisiana, USA.
Jonathan J. Hull and Peter E. Hart, "Toward Zero-Effort Personal Document Management", 2001 IEEE Computer 34, 3, p. 30-35.

* cited by examiner

*Primary Examiner* — Dov Popovici
(74) *Attorney, Agent, or Firm* — Fay Sharpe LLP

(57) ABSTRACT

A method for controlling a printer in a networked environment utilizes printer usage statistics and document features to determine whether to print a document or portion of a document. The networked environment includes printers, devices permitting the submittal of print job requests, a print server, and a document repository. The method includes receiving a job request to print a document from a device on the network and obtaining the document in digital form from the document repository or placing the document in digital form. Document and page specific information are extracted from the document. It is then determined whether printing of the document or a portion of the document is necessary based on analysis of the document and page specific information.

21 Claims, 4 Drawing Sheets

METHOD AND SYSTEM FOR CONTROLLING PRINTER UTILIZATION IN A NETWORKED ENVIRONMENT

BACKGROUND AND SUMMARY

This disclosure relates generally to printer utilization within a networked environment, and more particularly to a system and method for printer controller functionality in which device usage statistics and document features are used in determining whether to print a document or portion of a document.

In many networked environments, a potentially large number of users or clients must share resources including input/output devices such as the network's printer(s). Because printed versions are the most widely preferred format for reading documents, in many companies some documents or parts of documents may be printed multiple times, resulting in unnecessary costs in terms of paper, supplies, maintenance, support, lifecycle of the equipment, etc. Multiple copies of documents occur when multiple users desire to read a given document or when one or more users are working on the same document. Multiple copies may also occur when a single user decides to print the same document, or subsequent versions of a given document, at different times. In such cases, there are numerous situations in which duplicate printouts may be avoided or per-page print costs reduced.

Currently this problem is addressed through imposition of user account restrictions, such as print quotas, user identifications, or net addresses. For example, a particular user may be restricted to printing only at certain machines, or a user might be given a quota for printing. Alternatively, the number of pages that can be printed in a certain period of time may be limited, or the types of print jobs or copies that can be made may be limited. However, these approaches do not provide alternative paths to the physical version of the submitted document at a minimum cost from the user perspective. Additionally, they do not allow the printing device to become a manager of the content it prints. Existing printer controllers do not partially locate and track printed documents by any printer within the network, document owners, and available printout qualities as well as document status (draft, finished, active, etc.). Therefore, what is needed is a system and method that reduce overall printed page volume by avoiding duplicate copies of documents or parts of documents and provide unified printed document tracking.

All U.S. patents and published U.S. patent applications cited herein are fully incorporated by reference. The following patents or publications are noted.

U.S. Patent Application Publication No. 2004/0061909 to Ferlitsch et al. ("Scan to Cluster Print Structure and Methodology") describes a document printing system in which plural, potentially useable printers are reviewed in a preliminary discovery process to assess which ones are currently available for use and, of these, which have the best-suited operational characteristics relative to a particular printing job. The resulting collection of printers is then treated as a cluster tow which a scanned document is appropriately sent for implementation of the job.

U.S. Patent Application Publication No. 2004/0078425 to Sandfort et al. ("System and Method for Tracking Print System Utilization") describes a system and method for tracking a user's utilization of print resources. Data about a print job is collected from devices in a print pipeline, and is stored in a central database. Alternatively data about the print job is sent to a print accounting service by the devices in the pipeline or data is obtained by a print accounting service by polling of the devices in the pipeline.

U.S. Patent Application Publication No. 2004/0267868 to Wilk ("Method for Monitoring Print Jobs in a Data Processing Network") teaches a network including connected printers and print clients, with each print client permitting users to submit print jobs to the printers. The printer capacity available to each user is stored within the network and a computer code determines whether to accept a new print job based on a comparison of the capacity required to process the job and the user's available printer capacity. Also included is code for updating the available capacity information either indirectly by periodically adjusting the available capacity information of each user based on an approximation of the amount of print processing that has occurred or directly by determining the actual amount of capacity required to process the user's pending print jobs.

U.S. Patent Application Publication No. 2005/0078332 to Brown ("System and Method for Controlling a Printer Job Responsive to Attribute Analysis") teaches a method for controlling a printer involving accepting a job request, analyzing attributes of the requested job, and controlling the job output in response to the attribute analysis. Typically, a job is accepted with an associated user ID and a list of permitted attributes is cross-referenced to user ID. The attributes of the requested job are analyzed by comparing the analyzed attributes to permitted attributes. In some aspects of the method, the list of permitted attributes may additionally be cross-referenced to quotas. Job attributes analyzed may include whether the job is color or monochrome, paper size, paper tray to be used, document content, media type, simplex/duplex, stapling, and whether hole punching is requested.

The disclosed embodiments provide examples of improved solutions to the problems noted in the above Background discussion and the art cited therein. There is shown in these examples an improved method for controlling a printer in a networked environment. The method utilizes printer usage statistics and document features to determine whether to print a document or portion of a document, with the owner of the print job interacting with the controller to make this decision. The networked environment includes printers, devices permitting the submittal of print job requests, a print server, and a document repository. The method includes receiving a job request to print a document from a device on the network and either obtaining the document in digital form from the document repository or placing the document in digital form. Document and page specific information are extracted from the document. It is then determined whether printing of the document or a portion of the document is necessary based on analysis of the document and page specific information.

In an alternate embodiment there is disclosed a system for controlling a printer in a networked environment utilizing printer usage statistics and document features to determine whether to print a document or portion of a document. The networked environment includes a plurality of printers, devices permitting the submittal of print job requests, a print server, and a document repository. The system includes means for receiving a job request to print a document from a device on the network, means for obtaining said document in digital form from the document repository or placing said document in digital form. After extracting document and page specific information from said document, it is then determined whether to print the document or a portion of the document and on which printer to direct the job request based on analysis of the document and page specific information.

In yet another embodiment there is disclosed a computer-readable storage medium having computer readable program code embodied in the medium which, when the program code is executed by a computer, causes the computer to perform method steps for controlling a printer in a networked environment. The networked environment utilizes printer usage statistics and document features to determine whether to print a document or portion of a document. The networked environment includes a plurality of printers, devices permitting the submittal of print job requests, a print server, and a document repository. The method includes receiving a job request to print a document from a device on the network and obtaining the document in digital form from the document repository or placing the document in digital form. Document and page specific information are extracted from the document. It is then determined whether printing of the document or a portion of the document is necessary based on analysis of the document and page specific information.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
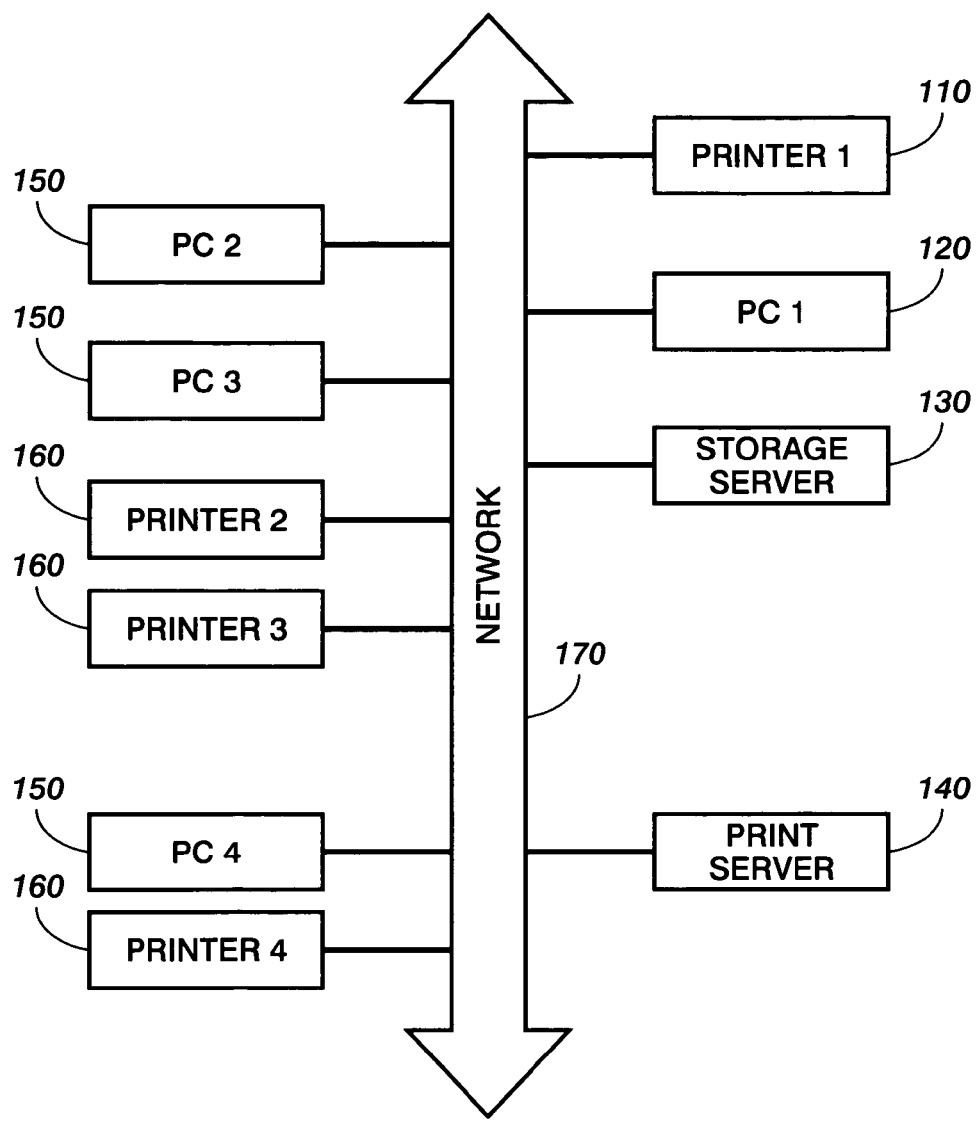
FIG. 1 is a block diagram of one embodiment of a system that controls printer utilization in a networked environment.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The print management method and system described herein provides a new printer controller functionality, in which the printer controller mines device usage statistics for estimating document characteristics relevant to preventing multiple printouts. Based on an analysis of the statistics and user interaction, the controller decides whether printing is required to accomplish delivery of a physical version of an electronic document, and, if it is not required to accomplish delivery, the print management system interacts with the user for providing an alternative. When a user activates the print management system and decides to print a document, the printer will be able to determine the validity or probability of features such as whether estimated document printing cost justifies printer functionality usage, whether the document is to be printed for reading purposes (not a form), and whether the document is an updated version (or an exact copy) of a previously printed document. Previous printouts could involve another user, another printer, or another print quality (draft/high quality, color/black and white). Other features include whether the document is active (being worked upon) by this and possibly other users, whether the owners of previously printed versions of the document work in the same groups and have similar access rights (for confidentiality purposes), and whether the document exists in a shared printed documents rack, in the library, etc.

If from this analysis the controller decides printing can be avoided, the system interacts with the user to propose alternatives such as redirecting the user to another user in possession of the document, informing the user he has an old version of this document with possibly a high number of repeated pages, querying whether to print only different pages and instructing on how to merge old and new versions. Other alternatives include indicating to the user that the document exists in a shared printed documents rack, library, etc., suggesting draft/BW printing for reducing costs, or redirecting the document to another printer (generally with lower printing cost).

While for the purposes of explanation the method and system will be described as functioning within a document production system to direct printing operations, it will be appreciated by those skilled in the art that the controller functionality may be beneficially utilized in any production environment which requires avoidance of duplication of a job or portion of a job to control costs. All such variations and modifications are fully contemplated by the scope of the specification and claims herein.

Various computing environments may incorporate capabilities for supporting document production capabilities utilizing printing system controllers, print submission utilities and finishing equipment on which the printer controller may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, the block diagram illustrates an example embodiment of a printing system that controls printer utilization in a networked environment. The main components of the environment are personal computers (120 and 150) through which users can access printers (110 and 160). Some or all of these printers may be managed by a print server 140. While for the purposes of brevity of description the method and system are described as utilizing a personal computer to access the network and the printer controller, such access may be accomplished by any known means, for example through a workstation dedicated to the printer, from a personal digital assistant (pda), smartphone, personal desktop via a remote user interface, or via an Internet print submission, all of which are encompassed by the specification and scope of the claims herein.

The storage server 130 is a shared/private document repository. It also provides storage for the print server, containing, for example, historical printing information, logs, etc. for the printers controlled by the print server. All these main components are coupled together via network 170. The system and method herein are not limited to a particular type of network system 170. Typical network interfaces include general-purpose systems such as POTS (plain-old telephone systems) and ISDN (Integrated Services Digital Network), as well as special-purpose systems such as a LAN (Local Area Network) or a WAN (Wide Area Network). Such networking environments are commonplace in offices, enterprise-wide computer networks, intranets and the Internet. Those skilled in the art will appreciate that the principles of the system and method described herein can be applied to virtually any network system without departing from the scope of the claims and specification.

In this context, a user on a personal computer 120 submits a print job through network 170 to printer 110, controlled by print server 140. The print job is first received by the print server, which is in charge of spooling the job and performing the required processing for the system and method described herein. This processing may require the print server to communicate with the storage server in order to obtain additional information on user, job characteristics, printer usage, etc. The print server then communicates back to the user on personal computer 120. Based on the user's response the job is finally sent to printer 110.

Figure 2:
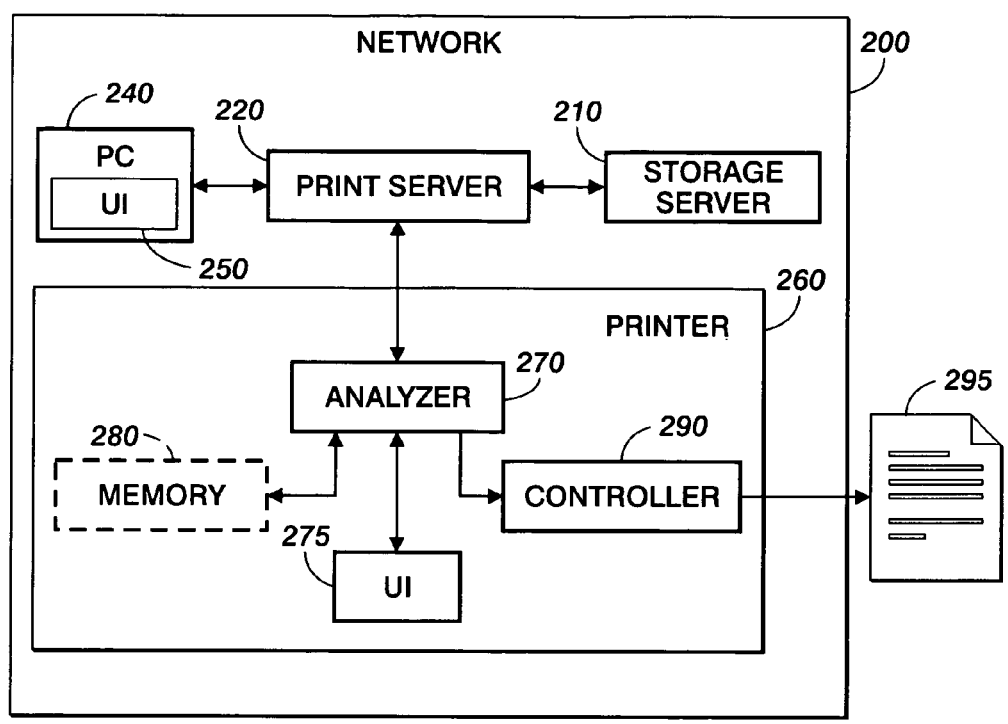
FIG. 2 is a block diagram of an embodiment of the controller architecture used to control printer utilization in a networked environment.

Turning to FIG. 2, there is shown operation of one embodiment of the controller architecture used to control printer utilization in a networked environment. The architecture includes a printer 260 with an analyzer 270, which accepts job requests from personal computer 240, having a user interface 250. The user interface 250 includes both input/output units, such as a display device, and peripheral units, such as a keyboard, mouse, or pointer. The output device, for example a monitor, displays information for viewing by a user of the printer and the input device is used to control a screen pointer provided by the graphical user interface of the operating system. Analyzer 270 may also include a user interface 275 on its front panel, which may include a viewing screen with scrolling and selection capability, to accept job requests and provide notice to the user of controls imposed upon the job output. Analyzer 270 provides job control commands to controller 290, which accepts the job control commands and supplies a job output 295 responsive to the job control commands.

Print server 220 accepts job requests from various sources such as PC 240. Each job request contains a candidate document with additional information such as the user identifier, the duplex mode indicator, and/or the paper type. Each job request is processed by the print server 220 using information from the storage server 210 to decide whether a document has to be printed or not. If the decision is to print the document, the document data is immediately sent to the analyzer 270 in the selected printer 260. If the decision is not to print the document, then the print server 220 stores the print request in the storage server 210 and sends user interaction data to the user interfaces 250 through the PC unit 240 and to the user interface 275 through the analyzer 270. Print server 220 waits for a user interaction result—a user answer or a predefined time, typically 15 seconds. Once the predefined time is over or the user interfaces return an answer, the print server processes the answer. Five outputs are possible, depending on the interaction results: 1) a job command with the original document is sent to the analyzer 270; 2) the document is modified and a job command with the modified document is sent to the analyzer 270; 3) a job command with the original document is sent to another printer; 4) the job is cancelled; or 5) another interaction request is sent to user interfaces 275 and/or 250.

Printer 260 may optionally include memory 280 which may be used as a temporary memory to save job request data when the analyzer 270 needs to interact with the user. It could also be used to save past interaction with the user for scenarios more complex than the one exemplified in this figure.

Analyzer 270 transmits document requests to print server 220, which obtains the electronic document from storage server 210, which acts as a document repository. The function of the storage server 210 is to provide the print server with the list of past print requests and additional information such as, for example, the user identifier, past user behavior, the date of the job request, or the type of paper output. The communication is bi-directional: for every print request submitted to the print server, the document is stored in the storage server.

An example of operation is the print command of document "doc.txt" coming from a user with identifier "A" through the user interface 250 in PC 240. The command is transmitted to the print server, which compares the document that has to be printed to past documents. The print server may find an identical document printed one week ago by another user with identifier "B". The print server stores "doc.txt" in the storage server 210 and sends a message on user interfaces 250 and 275 containing the following information: "User B printed the same document "doc.txt" one week ago. Are you sure you want to print this document?" The user "A" may answer "yes" on the user interface 275. This answer is transmitted to the print server through analyzer 270. The print server retrieves "doc.txt" in the storage server 210 and sends it to the analyzer 270 which transmits the job to the controller 290 and the printed version 295 of the document "doc.txt" is obtained by user "A".

Figure 3:
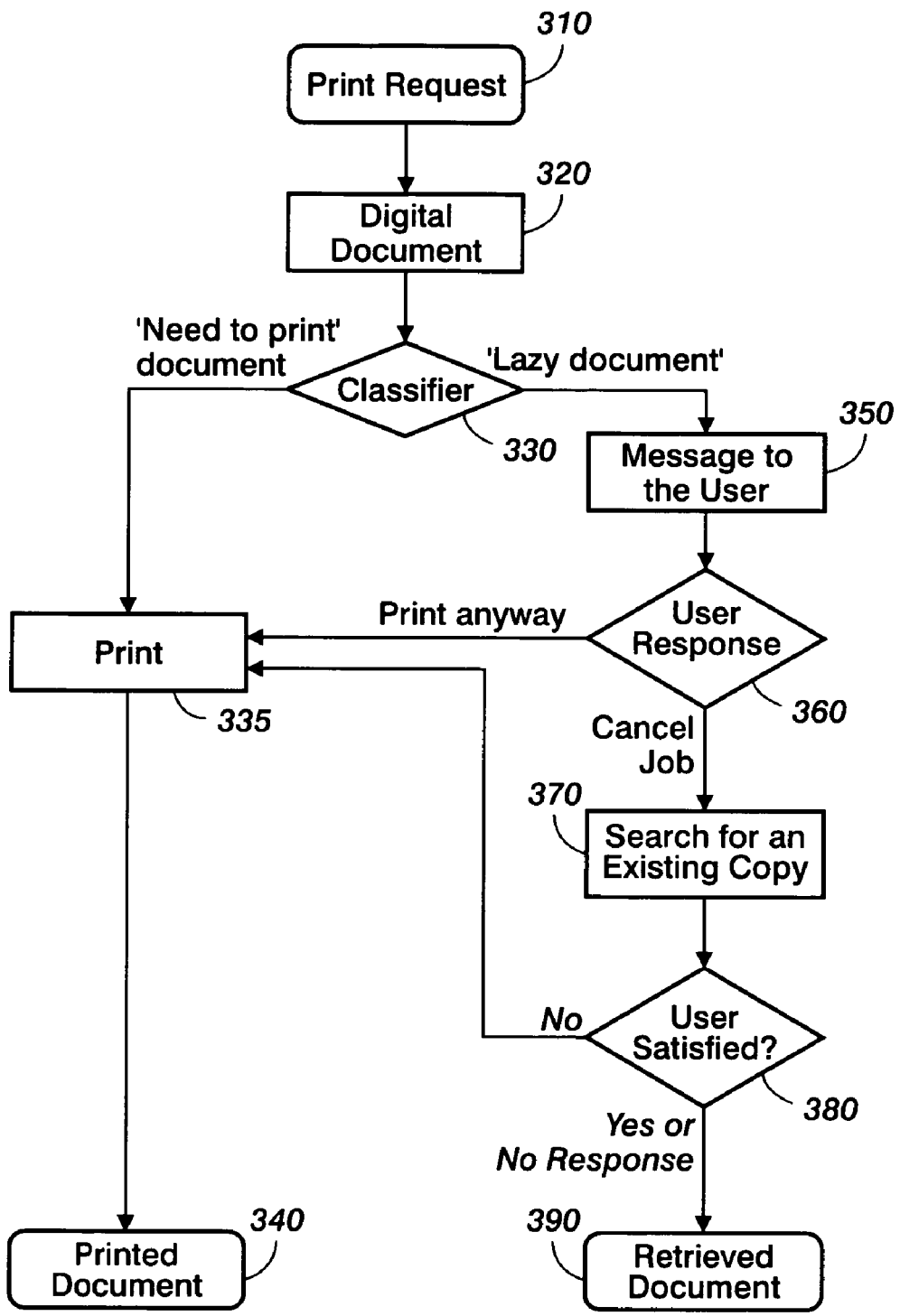
FIG. 3 is a flow diagram that illustrates an embodiment of operation of the system shown in FIG. 1.

Turning now to FIG. 3, the flow diagram illustrates an example embodiment of operation of the print management method. At 310 a print request is received from a personal computer on the network or through the user interface on the front panel of the printer. The document is placed in digital form or is retrieved in digital form from a storage server at 320. At 330 the adaptive classifier extracts features from the document and information about the user who requested a printing job to determine whether the document is a "need-to-print" document. Such features may include, but are not limited to, document print characteristics, such as estimated document printing cost, number of words in the document and number of words per page, number and location of objects in the document (images, tables, charts, etc.), and time at which the document was requested (at non-working hours, the user is not likely to request a hard copy of a document from another user). Additional extracted features include user characteristics, such as user login, user printing habits, user category (some users may be more likely to use print control functionality or to approve suggestions for obtaining the document or parts of the document from alternate sources), and for each user, user print patterns, such as the amount of already printed pages, the number of similar documents already printed and the response of the user to the print limitation suggestions in cases in which they were activated.

To summarize, the features may be of various types:
  a) General Document information and Page Specific Information: Document name, date/time printed, date generated, number of pages, document size, page identifier (unique page signature), page layout, page objects. These features are extracted from the document.
  b) User Specific Information: Document owner(s), user category and groups, user location, user printing habits (likely to accept/reject interaction), amount of printed pages, preferred settings, user/group quota status.

c) Print Settings Information: Printer information, printer location, printing quality, estimated document printing cost.

These features may be obtained using dedicated software or apparatus. Once the features are computed, they are provided as input to the classifier.

In one embodiment, the classifier may be organized as follows: Initially a simple rule-based classifier is employed to determine whether to directly discard the document as a potential duplicate document. For example, whether the document or any part of the document was previously printed can be determined from page signatures. Second, if the document is still a candidate as a duplicate document after this initial evaluation (because it has been previously printed), then the system utilizes additional information—referred above as User Specific Information and Print Settings information—from the print job request (for example, identification of the user who printed the document, when, and for what purpose, etc.).

Another classifier is then utilized to formulate a final decision as to whether or not the document is a 'need to print' document. In the first classifier, image comparison techniques may be applied to find similar documents. In the second classifier, supervised categorization techniques may be applied to make the final decision. Examples of such techniques include the Naïve Bayes classifier, Logistic Regression, or classification trees that may be applied at this point. The output of the classifier is a binary response as to whether or not the document is a 'need-to-print' document. The parameters of the classifier may be estimated using the historical data.

As a result of the classification, the system determines whether the document is a "need to print" document. If it is a "need to print" document, commands to print it are provided to the printer at 335 and the document is printed at 340. If it is not a "need to print" document, a message is sent to the user at 350 indicating that the document was printed by a prior user and offering print options. For example, one such message may read "The document that you wanted to print was printed by user (user identification) n days ago. Could you choose one of the following options? (Option 1 will be automatically chosen in 15 seconds)
1. Print the document anyway,
2. Cancel this job."

At 360 a determination is made by the user (either by default or active selection) whether to cancel the job or print the document anyway. If the user elects to print the document, commands to print it are provided to the printer at 335 and the document is printed at 340. If the user elects to cancel the job, a search for an existing copy is performed at 370 to redirect the user to another user in possession of the document or to indicate that the document exists in a shared printed documents rack, library, etc. The user is queried at 380 as to satisfaction with the document location options suggested. If the user responds that the options presented are not sufficient, commands to print it are provided to the printer at 335 and the document is printed at 340. If the options presented are satisfactory, the document is retrieved by the user at 390.

Figure 4:
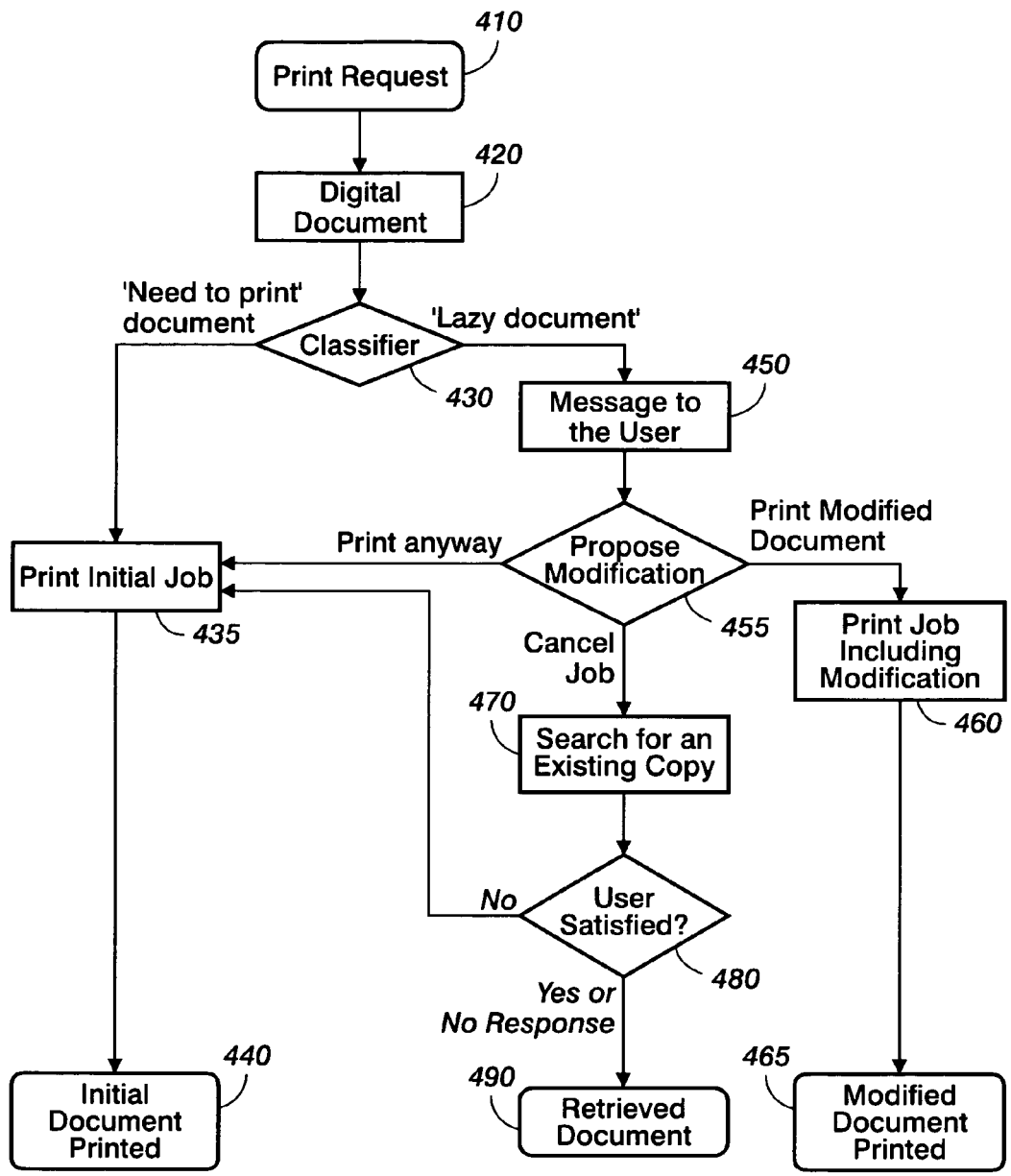
FIG. 4 is a flow diagram that illustrates another embodiment of operation of the system shown in FIG. 1.

Turning now to FIG. 4, the flow diagram illustrates another example embodiment of operation of the print management method. At 410 a print request is received from a personal computer on the network or through the user interface on the front panel of the printer. The document is placed in digital form or is retrieved in digital form from a storage server at 420. At 430 the adaptive classifier extracts features from the document to determine whether the document is a "need-to-print" document. The function and operation of classifier 430 have been described hereinabove with reference to item 330 in FIG. 3.

As a result of the classification, the system determines whether the document is a "need to print" document. If it is a "need to print" document, commands to print it are provided to the printer at 435 and the document is printed at 440. If it is not a "need to print" document, a message is sent to the user at 450 indicating that the document was printed earlier and offering print options. For example in the case of a document that has been updated, one such message may read "In the n-page document that you wanted to print, only page y is different from document (document address) that you printed x hour ago. Could you choose one of the following options? (Option 1 will be automatically chosen in 15 seconds.)
1. Print the document anyway,
2. Print page y only
3. Cancel this job."

Alternatively, in the case of a document that by a prior user with a different print quality, one such message may read "The document that you wanted to print was printed in color by user (user identification) n days ago. Could you choose one of the following options? (Option 1 will be automatically chosen in 15 seconds.)
1. Print the document anyway,
2. Do not print on this printer but send it to printer Studio (location),
3. Cancel this job."

At 455 a determination is made by the user (either by default or active selection) whether to cancel the job, print the document anyway, or accept the proposed modification to the print job. If the user elects to print the document, commands to print it are provided to the printer at 435 and the document is printed at 440. If the user elects to print the modified document, at 460 commands are provided to the printer and the modified document is printed at 465. If the user elects to cancel the job, a search for an existing copy is performed at 470 to redirect the user to another user in possession of the document or to indicate that the document exists in a shared printed documents rack, library, etc. The user is queried at 480 as to satisfaction with the document location options suggested. If the user responds that the options presented are not sufficient, commands to print the document are provided to the printer at 435 and the document is printed at 440. If the options presented are satisfactory, the document is retrieved by the user at 490.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for controlling a printer in a networked environment utilizing printer usage statistics and document features to determine whether to print a document or portion of a document, wherein the networked environment includes a plurality of printers, devices permitting the submittal of print job requests, a print server, and a document repository, the method comprising:
receiving a job request to print a document from a device on a network;
obtaining said document in digital form from the document repository or placing said document in digital form;
extracting document and page specific information from said document; and
determining whether printing of said document or a portion of said document is necessary based on analysis of said document and page specific information, including:
providing a list of past print requests using historical information provided for each of said plurality of printers stored in said repository of said networked environment,
applying a first classifier to find similar documents,
applying a second classifier for making a determination for whether printing of an electronic form of said document is necessary, and,
providing alternatives for accessing a physical version of said document if said determination is that printing of the electronic form of said document is unnecessary, presenting document location options for accessing a previously printed version of said document.

2. The method for controlling a printer in a networked environment utilizing printer usage statistics and document features according to claim 1, wherein said job request includes at least one candidate document and associated with each said candidate document at least one member selected from the group consisting of user identifier, duplex mode indicator, and paper type.

3. The method for controlling a printer in a networked environment utilizing printer usage statistics and document features according to claim 1, wherein said document and page specific information includes at least one member selected from the group consisting of document name, date/time printed, date generated, number of pages, document size, page identifier, page layout, and page objects.

4. The method for controlling a printer in a networked environment utilizing printer usage statistics and document features according to claim 1, further comprising: retrieving user specific information from the print server; and obtaining print settings information from at least one printer.

5. The method for controlling a printer in a networked environment utilizing printer usage statistics and document features according to claim 4, wherein said user specific information includes at least one member selected from the group consisting of at least one document owner, user category and groups, user location, user printing habits, amount of printed pages, preferred settings, and user/group quota status.

6. The method for controlling a printer in a networked environment utilizing printer usage statistics and document features according to claim 4, wherein said print settings information includes at least one member selected from the group consisting of printer information, printer location, printing quality, and estimated document printing cost.

7. The method for controlling a printer in a networked environment utilizing printer usage statistics and document features according to claim 1, wherein determining whether printing of said document or a portion of said document is necessary comprises determining whether said document or a portion of said document was previously printed.

8. The method for controlling a printer in a networked environment utilizing printer usage statistics and document features according to claim 7, wherein determining whether said document or a portion of said document was previously printed comprises applying image comparison techniques.

9. The method for controlling a printer in a networked environment utilizing printer usage statistics and document features according to claim 4, further comprising utilizing said user specific information and said print settings information to determine whether printing of said document is necessary.

10. The method for controlling a printer in a networked environment utilizing printer usage statistics and document features according to claim 9, wherein determining whether printing of said document or a portion of said document is necessary comprises applying supervised categorization techniques.

11. The method for controlling a printer in a networked environment utilizing printer usage statistics and document features according to claim 1, further comprising: presenting a message that said document was printed by a prior user; and offering print options, wherein said print options include printing said document or canceling said job request.

12. The method for controlling a printer in a networked environment utilizing printer usage statistics and document features according to claim 11, further comprising:
searching for an existing copy of said document if said job request is canceled;
presenting said document location options, wherein said document location options include a shared printed document repository;
querying whether said document location options are sufficient; and
printing said document if said document location options are not sufficient.

13. The method for controlling a printer in a networked environment utilizing printer usage statistics and document features according to claim 1, further comprising:
presenting a message that a portion of said document was printed earlier; and
offering print options, wherein said print options include printing said document, accepting a modification of said job request, or canceling said job request.

14. The method for controlling a printer in a networked environment utilizing printer usage statistics and document features according to claim 13, wherein said modification of said job request includes printing only non-duplicative pages of said document or sending said job request to an alternate printer.

15. The method for controlling a printer in a networked environment utilizing printer usage statistics and document features according to claim 14, further comprising:
searching for an existing copy of said document if said job request is canceled;

presenting said document location options, wherein said document locations options include the identification of another user in possession of said document or a shared printed document repository;

querying whether said document location options are sufficient; and printing said document if said document location options are not sufficient.

16. The method for controlling a printer in a networked environment utilizing printer usage statistics and document features according to claim 13, further comprising printing said modified job request.

17. The method for controlling a printer in a networked environment utilizing printer usage statistics and document features according to claim 11, further comprising printing said document if a user selects said print document option or if a user does not respond to said message within a predetermined period of time.

18. The method for controlling a printer in a networked environment utilizing printer usage statistics and document features according to claim 13, further comprising printing said document if a user selects said print document option or if a user does not respond to said message within a predetermined period of time.

19. The method for controlling a printer in a networked environment utilizing printer usage statistics and document features according to claim 1, further comprising providing printing command options, wherein said printing command options include at least one member selected from the group consisting of printing said document, modifying said document, selecting an alternate printer, canceling said job request, or transmitting a user interaction request.

20. A system for controlling a printer in a networked environment utilizing printer usage statistics and document features to determine whether to print a document or portion of a document, wherein the networked environment includes a plurality of printers, devices permitting the submittal of print job requests, a print server, and a document repository, the system comprising:

means for receiving a job request to print a document from a device on a network;

means for obtaining said document in digital form from the document repository or placing said document in digital form;

means for extracting document and page specific information from said document; and means for determining whether printing of said document or a portion of said document is necessary based on analysis of said document and page specific information, the means for determining including:

a means for providing a list of past print requests using historical information provided for each of said plurality of printers stored in said repository of said networked environment, a first classifier means for finding similar documents, a second classifier means for making a printing determination for whether printing of an electronic form of said document is necessary, and, a user-interaction means for providing alternatives for accessing a physical version of said document if said determination is that printing of an electronic form of said document is unnecessary, the user-interaction means presenting document location options for accessing a previously printed version of said document.

21. A non-transitory computer-readable storage medium having computer readable program code embodied in said medium which, when said program code is executed by a computer causes said computer to perform method steps for controlling a printer in a networked environment utilizing printer usage statistics and document features to determine whether to print a document or portion of a document, wherein the networked environment includes a plurality of printers, devices permitting the submittal of print job requests, a print server, and a document repository, the storage medium adapted to:

receive a job request to print a document from a device on a network;

obtain said document in digital form from the document repository or placing said document in digital form;

extract document and page specific information from said document; and determine whether printing of said document or a portion of said document is necessary based on analysis of said document and page specific information, user specific information, and print settings information, including providing a list of past print requests using historical information provided for each of said plurality of printers stored in said repository of said networked environment, applying a first classifier to find similar documents, applying a second classifier for making a determination for whether printing is necessary based on a binary repsonse, and, providing alternatives for accessing a physical version of said document if said determination is that printing of an electronic form of said document is unnecessary, presenting document location options for accessing a previously printed version of said document.

* * * * *